(No Model.) 2 Sheets—Sheet 1.

E. TURNELL.
BAND CUTTER AND FEEDER.

No. 519,279. Patented May 1, 1894.

Witnesses
Jas. K. McLathran

By his Attorneys,
C. A. Snow & Co.

Inventor
E. Turnell

THE NATIONAL LITHOGRAPHING COMPANY,
WASHINGTON, D. C.

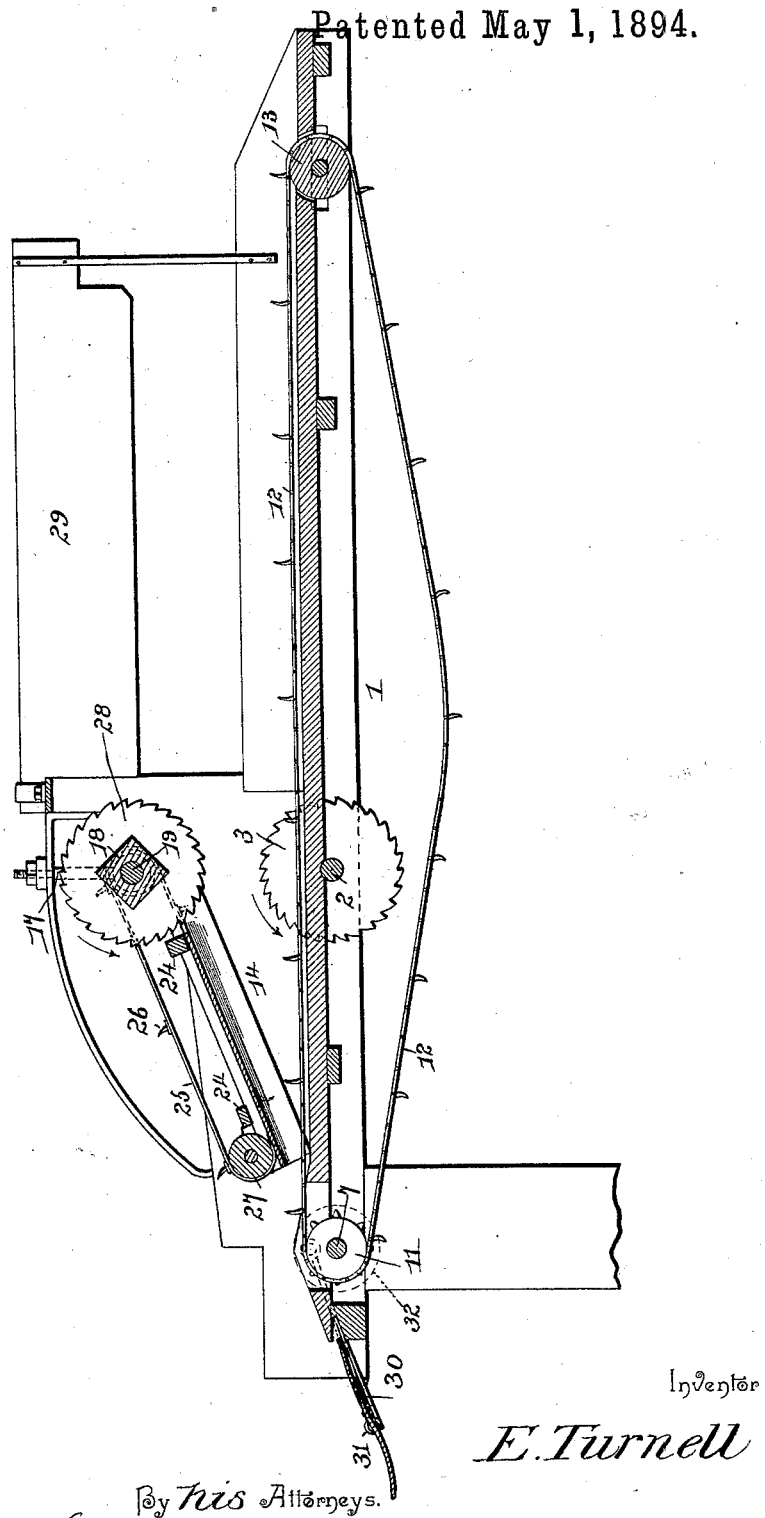

UNITED STATES PATENT OFFICE.

EDWARD TURNELL, OF ELM CREEK, NEBRASKA.

BAND-CUTTER AND FEEDER.

SPECIFICATION forming part of Letters Patent No. 519,279, dated May 1, 1894.

Application filed July 7, 1893. Serial No. 479,834. (No model.)

*To all whom it may concern:*

Be it known that I, EDWARD TURNELL, a citizen of the United States, residing at Elm Creek, in the county of Buffalo and State of Nebraska, have invented a new and useful Band-Cutter and Feeder, of which the following is a specification.

My invention relates to an improved band-cutter and feeder for thrashing machines, the objects in view being to provide a mechanism having a pressure feed and provided with means for thoroughly agitating the bundles and feeding the same from above and below to enable grain, whether wet or dry, to be fed to the thrasher, and to provide for the feeding of the grain into the cylinder of the thrasher in an even manner, thereby preventing any slugging or choking of the cylinder of the thrasher from uneven feeding by the band-cutter and feeder.

Further objects and advantages of the invention will appear in the following description, and the novel features thereof will be particularly pointed out in the appended claims.

Figure 1:
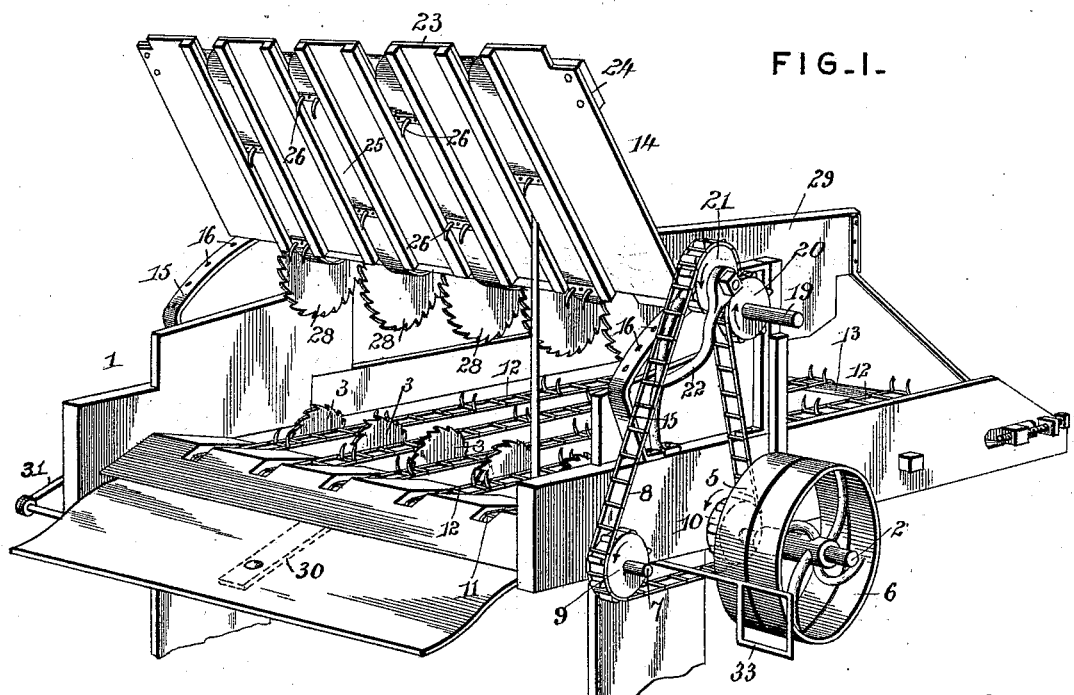
Figure 2:
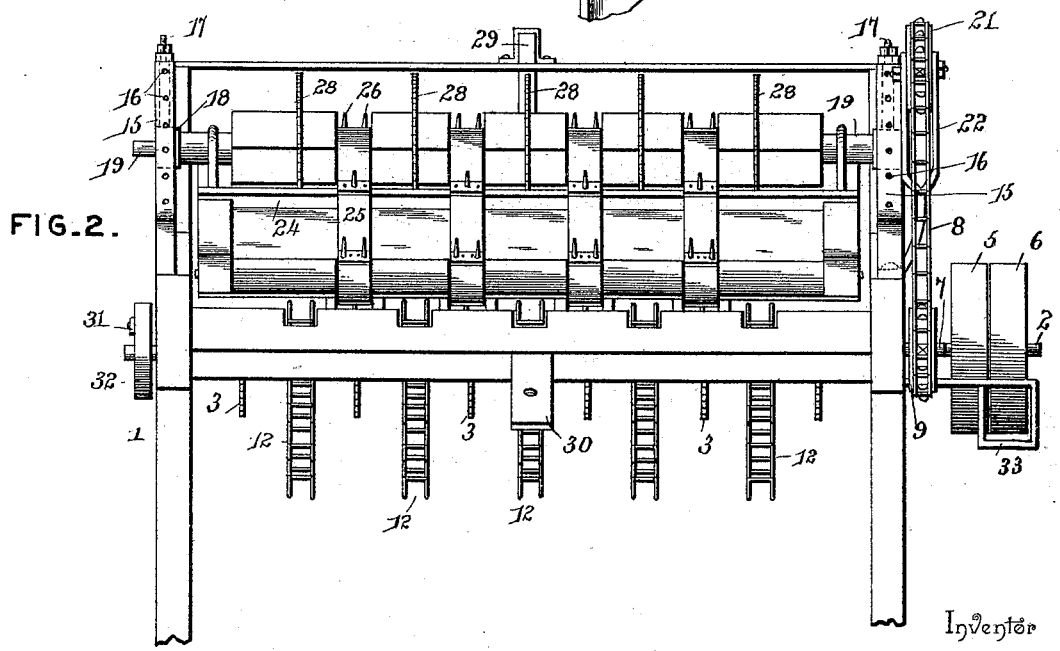

In the drawings: Figure 1 is a perspective view of a band-cutter and feeder embodying my invention, with the pivotal pressure platform elevated to show the interior construction. Fig. 2 is a front view of the machine with the parts in their operative positions. Fig. 3 is a longitudinal section of the same.

Similar numerals of reference indicate corresponding parts in all the figures of the drawings.

1 represents the body portion or table of the feeder, beneath which is arranged a transverse shaft 2, carrying a series of band-cutters 3. This shaft extends laterally beyond the body of the machine and carries a fixed pulley 5, and a loose pulley 6, adapted to carry a belt (not shown) extending from the cylinder shaft of the thrasher.

7 represents a countershaft which is arranged beneath the table parallel with the main shaft 2, and receiving motion therefrom through a chain 8, which passes around sprockets 9 and 10, carried respectively by the counter and main shafts. The countershaft is provided at intervals with chain-wheels 11, around which extend the longitudinally-disposed feed-chains 12, which, at the front end of the table, pass around a roller 13, which is adjustable to take up slack in the feed-chains. The pressure platform 14 is pivotally connected to brackets 15, arranged vertically at the sides of the table. These brackets are segmental in shape, concentric with the main shaft, and are provided with spaced perforations 16, adapted to receive bolts or stems 17, carried by the bearing-boxes 18. The bearing-boxes are adapted to be arranged at any desired distance from the front end of the feeder to bring the pressure platform adjacent to, or arrange it remote from, the outlet end of the feeder. The shaft 19, which is mounted in the bearings 18 and upon which the pressure platform is swiveled, carries a chain-wheel 20, which is engaged by the chain 8, which also passes around a chain-tightener 21, mounted upon a bracket 22. The pressure platform comprises, essentially, a series of longitudinally-disposed flanged plates 23, connected together by suitable cross-pieces 24, and agitator-belts 25, carrying hooked fingers 26 which incline or curve backward toward the inlet of the band-cutter and feeder, thereby holding and evenly distributing any grain that may pass through the feeder in uneven bunches in an even stream to the cylinder of the thrasher and preventing the feeder from slugging the cylinder. These belts travel between the adjacent edges of said plates and are carried by the shaft 19, and the parallel roller 27. The shaft 19 also carries agitator-disks 28, which, with the agitator-belts 25, co-operate with the feeder-chains 12, to agitate and properly feed the grain. A guide-board 29 is arranged adjacent to the inlet end of the feeder to direct the passage of the bundles prior to the cutting of the bands, and the flanged plates 23 with which the under surface of the platform 14 is provided serve to straighten and hold the grain in proper position for presentation to the thrasher.

30 represents an arm designed to support a feed-board, which is of the ordinary construction and is adapted to be operated by means of a pitman 31, for the purpose of working all the straw, &c., that is delivered by the feeder into the cylinder of the thrasher, and which is connected to a crank-disk 32, carried by the shaft 7.

33 represents a belt-shifter.

The operation of the above mechanism will be readily understood in connection with the drawings, upon which the direction of movement of the various shafts is indicated by arrows. The pressure platform rests upon the top of the grain and holds the latter in contact with the feeder-chains and cutters.

Various changes in the form, proportion, and the minor details of construction may be resorted to without departing from the principle or sacrificing any of the advantages of this invention.

Having described my invention, what I claim is—

1. The combination with a framework having a table, feed-chains, band-cutters, and means for operating the same, of a pivotal pressure platform, stationary perforated segmental brackets 15 carried by the framework, bearings adjustably bolted to said brackets, and a shaft mounted in said bearings and carrying the pressure platform, substantially as specified.

2. The combination with a framework having a table, band-cutters 3, feed-chains 12, and means for operating the same, of a transverse shaft 19 arranged above the plane of the feed-chains and operatively connected to the same, agitator-disks 28 carried by said shaft and arranged respectively above said feed-chains, a pressure platform fulcrumed upon said shaft, and agitator belts carried by said platform and operatively connected to the shaft, substantially as specified.

3. The combination with a framework having a feed-table, of spaced feed-chains, band-cutters arranged in the intervals between the feed-chains, means for operating said chains and cutters, a shaft 19 operatively connected to the feed-chains, spaced agitator-disks carried by the shaft and arranged respectively above the feed-chains, a pressure platform fulcrumed upon said shaft, and agitator-belts carried by the platform, arranged respectively above the band-cutters, and operatively connected to the shaft, substantially as specified.

4. The combination with a framework, alternately-arranged band-cutters and feed-chains, and means for operating the same, of a shaft arranged above the plane of the feed-chains and operatively connected thereto, agitator-disks fixed to said shaft, a pressure platform fulcrumed upon the shaft and comprising spaced longitudinal plates 23 provided with depending side guiding-flanges and cross-pieces 24, and agitator-belts arranged between said flanged plates and operatively connected to the shaft, substantially as specified.

In testimony that I claim the foregoing as my own I have hereto affixed my signature in the presence of two witnesses.

EDWARD TURNELL.

Witnesses:
T. C. ANDERSON,
C. W. FISHER.